W. C. HEDGCOCK.
FULCRUM MECHANISM.
APPLICATION FILED AUG. 8, 1921.
1,426,074.
Patented Aug. 15, 1922.
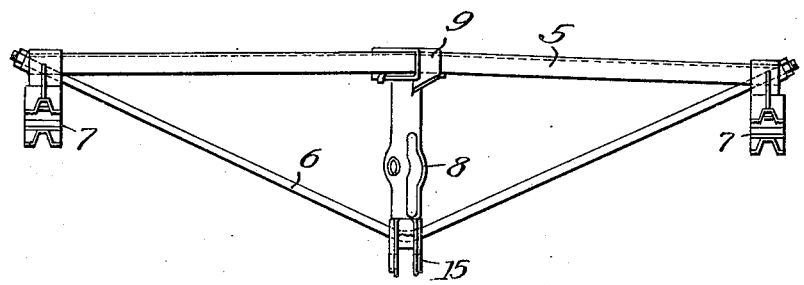
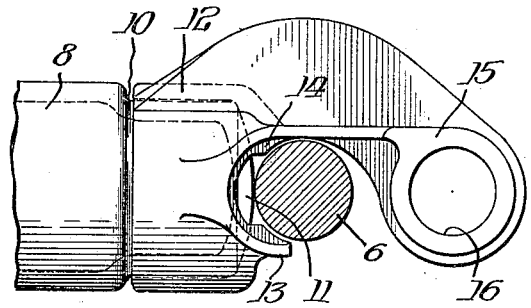
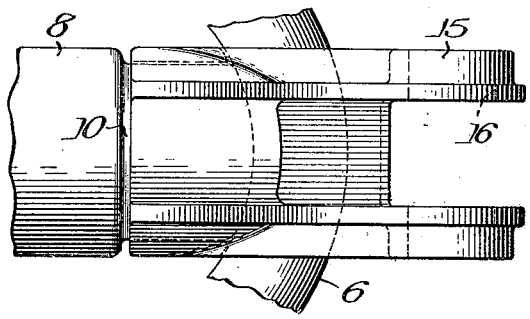
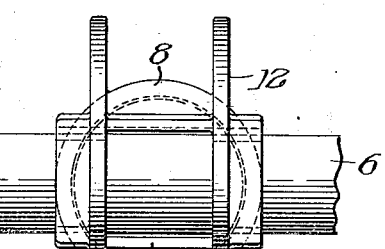
Inventor
William C. Hedgcock

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

FULCRUM MECHANISM.

1,426,074.  Specification of Letters Patent.  Patented Aug. 15, 1922.

Application filed August 8, 1921. Serial No. 490,501.

*To all whom it may concern:*

Be it known that I, WILLIAM C. HEDGCOCK, a citizen of the United States, residing at Chicago, in the county of Cook and State of Illinois, have invented certain new and useful Improvements in Fulcrum Mechanism, of which the following is a specification.

This invention relates to a new and improved brake beam, and more particularly to a beam provided with a reversible fulcrum and with a non-reversing fork for attachment to center suspension means.

In certain types of brake beams it is desirable to provide means by which brake beams may be connected to center supporting means. It is further desirable to provide fulcrums which may be reversed so that a beam may be used as either a right hand or left hand beam. In trussed brake beams the fulcrum extends between the compression member and the tension member and where a suspension fork or similar device has heretofore been provided, a joint has been made in the fulcrum. This jointed arrangement is undesirable, as a unitary fulcrum extending between the tension and compression members affords a much more rigid and durable construction.

It is an object of the present invention to provide a trussed brake beam having a fulcrum bearing upon both tension and compression members, the fulcrum being so constructed as to be reversible, and having associated therewith a fork for attachment to the center suspension device, the fork not being moved in reversing the fulcrum.

It is a further object to provide means of this character which are simple in design and construction and which are adapted for commercial use. Other and further objects will appear as the description proceeds.

Broadly, my invention comprises a brake beam fulcrum, having a portion embracing the compression member and having its opposite end bearing against the tension member.

This fulcrum is rotatable about its axis to change the beam from right to left hand or vice versa. A saddle is associated with the end of the fulcrum and engages the tension member, and is adapted to maintain the engagement between the fulcrum and the member. This saddle is not rotatable and is provided with a fork for connection to a center suspension device.

I have illustrated a preferred embodiment of my invention in the accompanying drawings, in which Figure 1 is a top plan view of a brake beam equipped with my device. Figure 2 is a fragmentary view showing the end of the fulcrum and the associated saddle and tension members.

Figure 3 is a view of Figure 2 as seen from above, and Figure 4 is a view of Figure 2 as seen from the right.

Referring now to the drawings; my improved device is adapted for use with the trussed type of brake beam as shown in Figure 1, this brake beam comprising the compression member 5, tension member 6 and the heads 7. The fulcrum 8 is interposed between the compression member 5 and tension member 6. The fulcrum is provided with the band portion 9 which embraces the compression member 5. This band portion is so formed as to permit rotation of the fulcrum about its axis from the point necessary for use as a right hand brake beam to that for use as a left hand brake beam.

As best shown in Figure 2, the fulcrum 8 is provided with a reduced end portion 10 which has a spherical head 11 in contact with the tension member 6. The saddle 12, is provided with a portion forming a seat for the reduced portion 10 of the fulcrum. This seat is cut away to permit the portion 11 of the fulcrum to engage the tension member. Upon either side of this cutaway portion are formed lips 13 and 14 which are adapted to retain the tension member properly seated upon the spherical head 11.

The saddle 12 is further provided with a fork 15 which extends beyond the tension member and which is provided with an opening 16 adapted to receive a pin to connect the saddle to a center suspension device.

With this form of fulcrum and saddle no joint is interposed between the tension member and compression member. When the fulcrum is rotated, the saddle remains fixed, being held against rotation by its lips engaging the tension member, and thus its fork is always in proper position for engagement with the center suspension device.

Obviously, the fork 15 may be varied in design to accommodate differing types of suspension devices. My device is composed of but few and rugged parts which are simple in construction and in application, and well adapted for commercial production and use.

It is my intention to cover all modifications of the invention falling within the spirit and scope of the following claims.

I claim:

1. In a brake beam having a compression member, a tension member and a fulcrum interposed therebetween and engaging said members, a member removably associated with the fulcrum and adapted to coact with the tension member to maintain the fulcrum engaged therewith.

2. In a brake beam having a compression member, a tension member and a fulcrum interposed therebetween and engaging said members, a member removably associated with the fulcrum and adapted to coact with the tension member to maintain the fulcrum engaged therewith, said removable member being provided with a fork adapted to be connected to a center suspension device.

3. In a brake beam having a compression member, a tension member and a fulcrum interposed therebetween, and engaging said members, said fulcrum being rotatable about its axis to selectively place it in operative position, a member removably associated with the fulcrum and adapted to coact with the tension member to maintain the fulcrum engaged therewith.

4. In a brake beam having a compression member, a tension member and a fulcrum interposed therebetween and engaging said members, said fulcrum being rotatable about its axis to selectively place it in operative position, a member removably associated with the fulcrum and adapted to coact with the tension member to maintain the fulcrum engaged therewith, the fulcrum being rotatable independently of said member.

5. In a brake beam having a compression member, a tension member and a fulcrum interposed therebetween, the fulcrum having a face engaging the tension member, and a member coacting with the fulcrum and tension member to maintain the fulcrum face in engagement therewith.

6. In a brake beam having a compression member, a tension member and a fulcrum interposed therebetween, the fulcrum having a face engaging the tension member, and a member coacting with the fulcrum and the tension member, to maintain the fulcrum face in engagement therewith, the fulcrum being rotatable relative to the coacting member.

7. In a brake beam having a compression member, a tension member and a fulcrum interposed therebetween, a cylindrical portion of the fulcrum located adjacent the tension member and a coacting member fitting about said cylindrical portion and having means engaging the tension member to maintain the fulcrum in operative relation with said tension member, a face of the fulcrum engaging the tension member.

8. In a brake beam having a compression member, a tension member, a fulcrum member having a portion associated with the compression member in such manner as to permit the fulcrum to be selectively rotated to right or left hand position, a spherical head upon the fulcrum engaging the tension member and means adapted to maintain said head in engagement with the tension member.

9. In a brake beam having a compression member, a tension member, a fulcrum member having a portion associated with the compression member in such manner as to permit the fulcrum to be selectively rotated to right or left hand position, a spherical head upon the fulcrum engaging the tension member, and a coacting securing member engaging the tension member in such manner as to be fixed against rotation, and engaging the spherical head of the fulcrum in such manner as to maintain it in engagement with the tension member and to permit it to rotate relative thereto.

10. In a brake beam having a compression member, a tension member, a fulcrum member having a portion associated with the compression member, in such manner as to permit the fulcrum to be selectively rotated to right or left hand position, a spherical head upon the fulcrum engaging the tension member, and a coacting securing member engaging the tension member in such manner as to be fixed against rotation, and engaging the spherical head of the fulcrum in such manner as to maintain it in engagement with the tension member and to permit it to rotate relative thereto, said securing member being provided with a fork adapted to be connected to a center suspension device.

Signed at Chicago, Illinois, this 2nd day of August, 1921.

WILLIAM C. HEDGCOCK.